US009106778B2

(12) United States Patent
Beegle et al.

(10) Patent No.: US 9,106,778 B2
(45) Date of Patent: Aug. 11, 2015

(54) DEVICE AND METHOD FOR DETERMINING PRESENCE OF A DOCUMENT TO BE IMAGED AND PROVIDING A PREVIEW OF THE DOCUMENT

(75) Inventors: John Steele Beegle, Lexington, KY (US); Anthony Michael King, Lexington, KY (US); Ronald Todd Sellers, Stamping Ground, KY (US); Robert Edward Stoss, Lexington, KY (US)

(73) Assignee: Lexmark International, Inc.KY (US)

( * ) Notice: Subject to any disclaimer, the term of this patent is extended or adjusted under 35 U.S.C. 154(b) by 627 days.

(21) Appl. No.: 13/088,193

(22) Filed: Apr. 15, 2011

(65) Prior Publication Data

US 2012/0262737 A1 Oct. 18, 2012

(51) Int. Cl.
*H04N 1/60* (2006.01)
*H04N 1/00* (2006.01)

(52) U.S. Cl.
CPC .......... *H04N 1/0044* (2013.01); *H04N 1/00551* (2013.01)

(58) Field of Classification Search
CPC combination set(s) only.
See application file for complete search history.

(56) References Cited

U.S. PATENT DOCUMENTS 6,088,025 A 7/2000 Akamine et al.
6,466,302 B1 * 10/2002 Rousseau et al. ............... 355/61
7,490,824 B2 2/2009 Kakuta
8,363,254 B2 1/2013 Ichikawa et al.
2002/0075529 A1 * 6/2002 Sato et al. ..................... 358/505
2004/0114786 A1 * 6/2004 Cannon et al. ................ 382/127
2006/0023271 A1 * 2/2006 Boay et al. .................... 358/504
2007/0076251 A1 * 4/2007 Yasuda ........................ 358/1.15
2010/0053706 A1 3/2010 Jasinski et al.
2010/0149147 A1 * 6/2010 Zhang et al. .................. 345/207
2010/0188679 A1 * 7/2010 Nakagawa ................... 358/1.12
2012/0243054 A1 9/2012 Sellers

FOREIGN PATENT DOCUMENTS

JP 2006217103 A * 8/2006

OTHER PUBLICATIONS

U.S. Patent and Trademark Office, Notice of Allowance for U.S. Appl. No. 13/072,727 dated Sep. 13, 2013.

* cited by examiner

*Primary Examiner* — Barbara Reinier
*Assistant Examiner* — Christopher D Wait

(57) ABSTRACT

A previewing device that includes a covering member coupled to an imaging surface and a sensing unit operatively coupled to the covering member. The sensing unit is adapted to automatically capture an image corresponding to the imaging surface upon detecting the covering member is in a closed configuration. A preview unit is operatively coupled to the sensing unit is configured to display a preview of image data corresponding to an image on the imaging surface.

24 Claims, 3 Drawing Sheets

100 102 140 180 160 C F 130 B A D 110 120 200 122 E 170

DEVICE AND METHOD FOR DETERMINING PRESENCE OF A DOCUMENT TO BE IMAGED AND PROVIDING A PREVIEW OF THE DOCUMENT

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The present disclosure relates generally to imaging systems, such as scanners, copiers, fax machines, and multi-function imaging systems, and more particularly, to an imaging system adapted to provide a preview of a document to be imaged.

2. Description of the Related Art

In various imaging systems, such as a scanner, a copier, a fax machine, and a multi-function imaging system (like an All-in One (AIO) device), an original document is may be placed upon an imaging surface/platen made of a material, such as glass, for scanning, copying, printing and other purposes.

However, a user of an imaging system may encounter difficulties in appropriately aligning an original document on the scanner's platen in order to obtain an optimally scanned image, such as an image with maximum scan quality and an image scanned in a shortest possible time. Accordingly, guiding a user about positioning an original document on a platen of different types of imaging systems may be advantageous. In prior art systems, guiding/communicating a user about aligning an original document along a home position (reference point) of an imaging system is accomplished by providing indications, such as moldings, painted arrows and markings, adjacent to a home position on a housing of the imaging system. However, such indications may be overlooked or missed by the user. For example, a user may be unable to perceive marks provided along an edge of a scanner's housing. Accordingly, the user may fail to align an original document along the home position as intended, thereby leading to an unacceptable scan.

In various imaging systems, such as a scanner, a copier, a fax machine, and a multi-function imaging system (like an All-in One (AIO) device), an original document may be placed upon an imaging surface/platen made of a material, such as glass, for scanning, copying, printing and other purposes.

Accordingly, there persists a need for an efficient imaging system that facilitates an appropriate alignment of documents, prior to an imaging operation in order to obtain optimal images.

SUMMARY

Disclosed herein is a previewing device that includes a covering member coupled to an imaging surface and a sensing unit operatively coupled to the covering member. The sensing unit is adapted to automatically capture an image corresponding to the imaging surface upon detecting the covering member is in a closed configuration. A preview unit is operatively coupled to the sensing unit is configured to display a preview of image data corresponding to an image on the imaging surface.

BRIEF DESCRIPTION OF THE DRAWINGS

The above-mentioned and other features and advantages of the present disclosure, and the manner of attaining them, will become more apparent and will be better understood by reference to the following description of embodiments of the disclosure taken in conjunction with the accompanying drawings.

DETAILED DESCRIPTION

Disclosed herein is a previewing device that includes a covering member coupled to an imaging surface and a sensing unit operatively coupled to the covering member. The sensing unit is adapted to automatically capture an image corresponding to the imaging surface upon detecting that the covering member is in a closed configuration. A preview unit operatively coupled to the sensing unit is configured to display a preview of image data corresponding to an image on the imaging surface.

The present disclosure provides a previewing and imaging system for generating a preview of an image corresponding to a document prior to an imaging operation. The preview may enable a user to better visualize the type of final image prior to performing the imaging operation, thereby eliminating the need to redo the imaging operation and as a result possibly prevent waste of resources, such as energy, ink or toner, and/or paper. The previewing and imaging system of the present disclosure may be an imaging system, such as a scanner, a copier, a fax machine, or a multi-function imaging system (such as an All-in One (AIO) device). Further, the term "imaging operation" may relate to a scanning operation, a copying operation, and other imaging operations. One example embodiment of the previewing and imaging system is explained in conjunction with FIG. 1.

Figure 1:
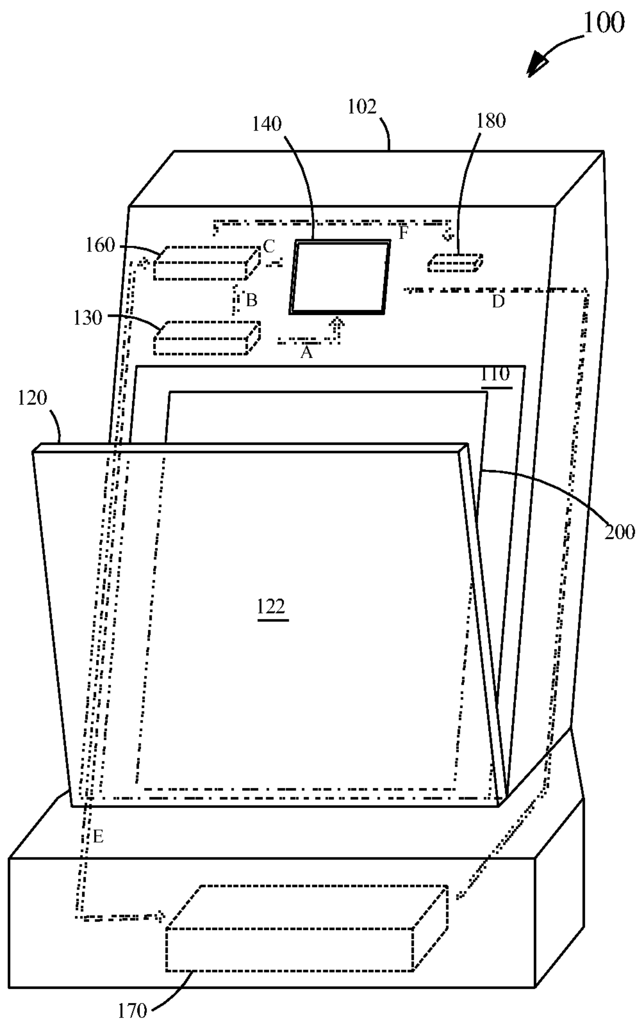
FIG. 1 depicts a perspective view of a previewing and imaging system in accordance with one example embodiment.

FIG. 1 depicts a perspective view of one example embodiment of a previewing and imaging system 100, in accordance with an embodiment of the present disclosure. System 100 may be an AIO device, utilizing a camera scan system. System 100 is may be a vertically-oriented system. In an alternate embodiment, system 100 may be configured as a horizontally-oriented system, such as a horizontally-oriented flatbed AIO device.

System 100 may include an imaging surface or platen 110 configured to carry a document, such as a document 200, to be imaged during an imaging operation. The imaging surface 110 may be constructed from a rigid, transparent and/or translucent material, such as glass. As shown in FIG. 1, the imaging surface 110 is configured vertically. However, it should be understood that the imaging surface 110 may be configured horizontally without departing from the scope of the present disclosure.

System 100 may further include a covering member or lid 120 coupled with the imaging surface 110 and adapted to assume one of an open configuration and a close configuration. The covering member 120 may be coupled with the imaging surface 110 by one or more attaching means, such as pins and/or hinges. The open configuration of the covering member 120 refers to a configuration or position of the covering member 120 when the covering member 120 attached to the imaging surface 110 partially covers the imaging surface 110, thereby leaving the imaging surface 110 at least partially exposed. The open configuration may also refer to a configuration and/or position where the imaging surface 110 is ready to receive a document for imaging. The close configuration of the covering member 120 may relate to a configuration or position of the covering member 120 when the covering member 120 completely covers the imaging surface 110. The closed configuration may also refer to a configuration and/or position where the imaging surface 110 is not ready or has already received a document. As depicted in FIG. 1, the covering member 120 is shown in an open configuration.

System 100 may include a sensing or capture unit 130 operatively coupled to the covering member 120 and configured in proximity to the imaging surface 110, such as adjacent to the imaging surface 110 within a housing 102 of the system 100. The sensing unit 130 may be adapted to capture an image corresponding to the imaging surface 110 in response to the covering member 120 assuming the closed configuration. The sensing unit 130 may include a photo-sensor array for capturing the image corresponding to the entire imaging surface 110. Further, the sensing unit 130 may utilize a dedicated optical assembly for capturing the image. The optical assembly may be an optics system known in the art for an image capturing sensor, such as the sensing unit 130. The operative coupling between the sensing unit 130 and the covering member 120 may be established by means of electrical signals. Specifically, the sensing unit 130 may be able to detect the presence of the covering member 120 in the close configuration in order to trigger a capture of the image on the imaging surface 110. In alternate embodiment, the sensing unit 130 may be able to detect and capture a document being placed on the imaging surface 110 when the lid is in an open configuration.

System 100 may also include a preview unit 140 operatively coupled to the sensing unit 130. The operative coupling between the preview unit 140 and the sensing unit 130 may be established by means of electrical signals (as depicted by an arrow 'A' in FIG. 1). As shown in FIG. 1, the preview unit 140 may be configured on the housing 102 and adjacent to the imaging surface 110 of the system 100. In an alternate embodiment, the preview unit 140 may be configured at any other location on the system 100. For example, the preview unit 140 may be configured on an outer surface 122 of the covering member 120.

The preview unit 140 may be a display screen or monitor that is configured to display a preview of the image corresponding to the imaging surface 110. The preview unit 140 may be any display screen or monitor capable of displaying a preview of the document 200 and/or the edges of document 200 in relation to the location of the document on imaging surface 110. For example, the preview of the image may correspond to the document 200 when the document 200 is placed on the imaging surface 110. In an alternate embodiment, the preview may correspond to edges of the document 200 on the imaging surface 110. In some embodiments, the preview image may be a preliminary, low resolution or non-final image formed prior to the actual imaging operation.

Some example displays may include, but are not limited to, a low resolution, colored Liquid Crystal Display (LCD) screen and a high resolution, colored LCD screen. In yet other example embodiments, the preview unit 140 may be a touch screen. In one example embodiment, the preview unit 140 may display a home screen or a screen saver when system 100 is in an idle state. In some embodiments, such home screen or screen saver may be displayed on the preview unit prior to the placing or positioning of document 200 on the imaging surface 110 and/or prior to performing any imaging operation. In some other example embodiments, the preview unit may enter into a sleep mode or display nothing on the screen.

FIG. 1 depicts a perspective view of one example embodiment of a previewing and imaging system 100, in accordance with an embodiment of the present disclosure. System 100 may be an AIO device, utilizing a camera scan system. System 100 may be a vertically-oriented system. In an alternate embodiment, system 100 may be configured as a horizontally-oriented system, such as a horizontally-oriented flatbed AIO device.

Figure 3:
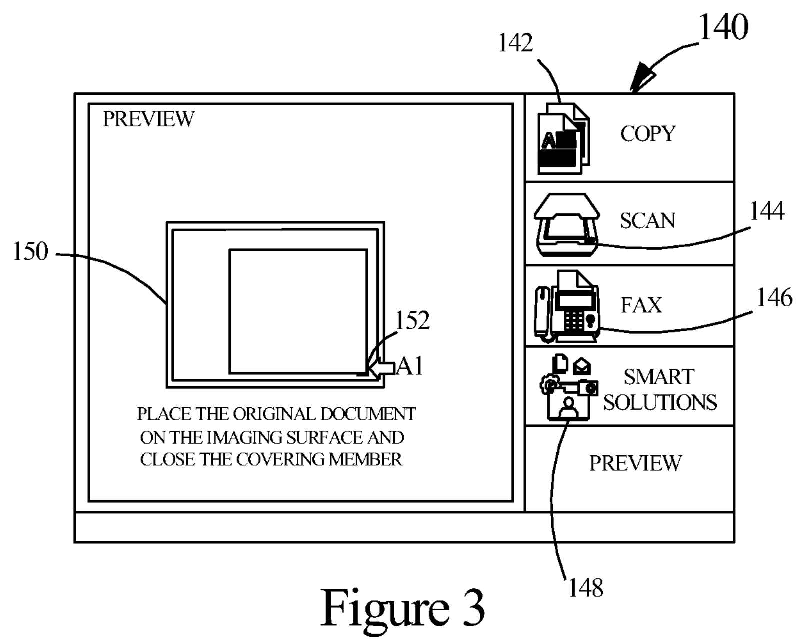
FIG. 3 depicts a layout of the preview unit of the previewing and imaging system of FIG. 1, when a covering member is facilitated to assume an open configuration for positioning the document on the imaging surface of the previewing and imaging system.

FIG. 3 depicts an example layout of the preview unit 140 when the covering member 120 is in the open configuration to enable the user to position the document 200 on the imaging surface 110 for processing. As depicted in FIG. 3, the preview unit 140 may provide a preview representing guiding display objects, such as a display object 150, and one or more markings, such as a marking 152 for guiding the user to place/position the document 200 on the imaging surface 110 according to the marking 152. The marking 152 may be a mark of any shape, size and color that may be easily perceived by the user. The preview unit 140 may also provide text or other instructional information such as 'PLACE THE ORIGINAL DOCUMENT ON THE IMAGING SURFACE AND CLOSE THE COVERING MEMBER' and the like along with a directional arrow 'A1' in order to indicate or guide the user to in placing the document 200 in the appropriate area of the imaging surface 110 for processing.

System 100 may further include a covering member or lid 120 coupled with the imaging surface 110 and adapted to assume one of an open configuration and a elese closed configuration. The covering member 120 may be coupled with the imaging surface 110 by one or more attaching means, such as pins and/or hinges. The open configuration of the covering member 120 refers to a configuration or position of the covering member 120 when the covering member 120 attached to the imaging surface 110 partially covers the imaging surface 110, thereby leaving the imaging surface 110 at least partially exposed. The open configuration may also refer to a configuration and/or position where the imaging surface 110 is ready to receive a document for imaging. The closed configuration of the covering member 120 may relate to a configuration or position of the covering member 120 when the covering member 120 completely covers the imaging surface 110. The closed configuration may also refer to a configuration and/or position where the imaging surface 110 is not ready or has already received a document. As depicted in FIG. 1, the covering member 120 is shown in an open configuration.

System 100 may include a sensing or capture unit 130 operatively coupled to the covering member 120 and configured in proximity to the imaging surface 110, such as adjacent to the imaging surface 110 within a housing 102 of the system 100. The sensing unit 130 may be adapted to capture an image corresponding to the imaging surface 110 in response to the covering member 120 assuming the closed configuration. The sensing unit 130 may include a photo-sensor array for capturing the image corresponding to the entire imaging surface 110. Further, the sensing unit 130 may utilize a dedicated optical assembly for capturing the image. The optical assembly may be an optics system known in the art for an image capturing sensor, such as the sensing unit 130. The operative coupling between the sensing unit 130 and the covering member 120 may be established by means of electrical signals. Specifically, the sensing unit 130 may be able to detect the presence of the covering member 120 in the closed configuration in order to trigger a capture of the image on the imaging surface 110. In an alternate embodiment, the sensing unit 130 may be able to detect and capture a document being placed on the imaging surface 110 when the lid is in an open configuration.

Figure 5:
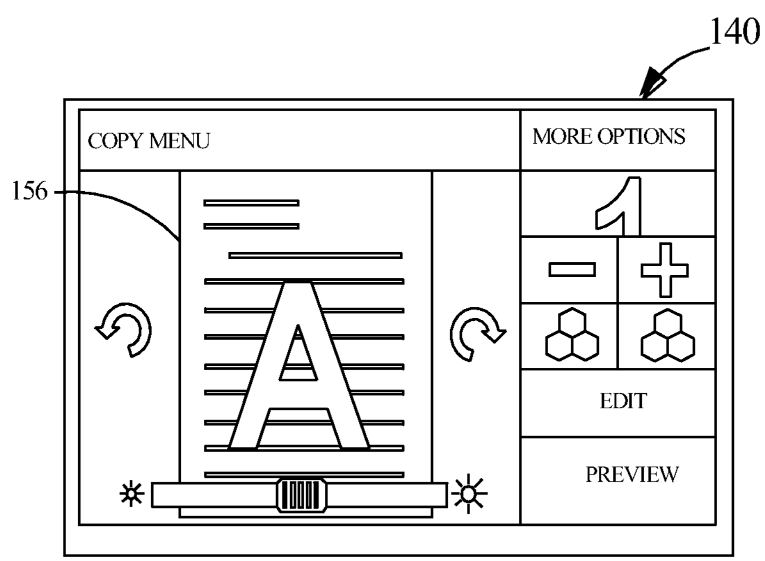
FIG. 5 depicts a layout of the preview unit of the previewing and imaging system of FIG. 1 for a copying operation.

For example, the preview may be formatted or adjusted to correspond to the specific imaging operation desired by the user, such as copying, scanning and the like. Such preview settings may be automatically or manually corrected or adjusted for the document 200 prior to being displayed on the display and/or prior to the imaging operation. For example, as shown in FIG. 5, if the imaging operation selected by the user is "COPY", the image preview of document 200 may be formatted to match copy settings, i.e., the preview of the image may be adjusted or corrected to the required paper size, image color controls such as color or grayscale, appropriate resize setting, and the like. The preview unit 140 may also display other menu options corresponding to features or functions of the copying operation.

In another aspect, if the imaging operation selected is faxing, the preview of the document 200 may be formatted to match fax settings, e.g., black and white with 1 bit color depth, an intended fax paper size, and the like. Such preview settings may be automatically or manually corrected prior to producing a fax of the document 200. The preview of the document 200 for the fax operation may also be formatted and auto-cropped to match scan settings, e.g., auto-cropped to a predefined scan area. Accordingly, the preview of document 200 may correspond to the imaging operation intended to be performed on document 200.

In some example embodiments, the preview shown on the display may be modified or change without recapturing the document on the imaging surface 110 if a different menu option or feature is selected by the user. For example, if the imaging operation selected is changed from faxing to copying, the fax preview shown on the display may be automatically changed to show a preview using copying settings. In an alternate embodiment, the document may be recaptured between imaging operation selections in order to display a preview using the settings corresponding to the imaging operation selected.

Once the user removes or withdraws the document 200 and the covering member 120 assumes the closed configuration, the preview unit 140 may continue displaying the preview or resume displaying the home screen, default layout or screen saver. In alternate example embodiments, the preview unit may display a new preview of the imaging surface 110 without the document 200 or a blank screen.

FIG. 3 depicts an example layout of the preview unit 140 when the covering member 120 is in the open configuration to enable the user to position the document 200 on the imaging surface 110 for processing. As depicted in FIG. 3, the preview unit 140 may provide a preview representing guiding display objects, such as a display object 150, and one or more markings, such as a marking 152 for guiding the user to place/position the document 200 on the imaging surface 110 according to the marking 152. The marking 152 may be a mark of any shape, size and color that may be easily perceived by the user. The preview unit 140 may also provide text or other instructional information such as 'PLACE THE ORIGINAL DOCUMENT ON THE IMAGING SURFACE AND CLOSE THE COVERING MEMBER' and the like along with a directional arrow 'A1' in order to indicate or guide the user in placing the document 200 in the appropriate area of the imaging surface 110 for processing.

The system 100 may include an imaging unit 170 adjacent to the imaging surface 110 and adapted to perform the desired imaging operation. Specifically, the imaging unit 170 may include an optical assembly and a sensor array for performing the imaging operation, as is known in the art. The optical assembly may include one or more light sources for illuminating the document 200, one or more mirrors for reflecting the light provided from the document 200, and one or more lenses for focusing the light reflected from the one or more mirrors onto the sensor array. The imaging unit 170 may utilize either the same optical assembly used by the sensing unit 130 or a separate optical assembly. The imaging unit 170 may be operatively coupled with the preview unit 140 and the processing unit 160 in order to perform the imaging operation once an appropriate preview indicative of correct alignment of the document 200 on the imaging surface 110, is displayed on the preview unit 140 and/or the imaging operation is selected or initiated by the user. The operative coupling of the imaging unit 170 with the preview unit 140 and the processing unit 160 may be established by means of electrical signals (as depicted by arrows 'D' and 'E', respectively, in FIG. 1).

The system 100 may include an audio unit 180 operatively coupled to the processing unit 160 and adapted to generate an audio signal, such as a camera shutter sound, when the preview of the image 154 and image 156 are displayed on the preview unit 140. The operative coupling of the audio unit 180 with the processing unit 160 may be established by means of electrical signals (as depicted by an arrow 'F' in FIG. 1). The audio unit 180 may also be operatively coupled with the preview unit 140.

The instant preview and the shutter sound may be automatically suppressed when the user closes the covering member 120 without having the document 200 carried by the imaging surface 110. Accordingly, the user may not be subjected to view a "blank" preview every time the covering member 120 assumes the closed configuration after removing the document 200 from the imaging surface 110. The image 154 of the imaging surface 110 may be captured when the covering member 120 assumes the closed configuration. The processing unit 160 may then detect the presence of the document 200 and analyze the image 154 for content. The preview of the image 154 containing the image 156 may then be displayed on the preview unit 140 along with the shutter sound, when the processing unit 160 detects the presence of the document 200 and the content of the document 200 on the imaging surface 110. Alternatively, the preview and the shutter sound may be suppressed when the absence of the document 200 and the content is detected by the processing unit 160.

The preview of the image may be displayed instantly, such as in a short time period ranging from about a fraction of seconds to about few seconds. Further, some or all of the image quality processing operations, such as gamma correction, shading correction, color tables, and the like, which consume time may be skipped or omitted in order to provide the instant preview. In such example embodiments, increasing the illumination output may help improve the image quality of the preview. Such an increase in illumination causes the image sensor of the imaging unit 170 to saturate in order to effectively emulate the effects of gamma correction and shading correction. Such an arrangement may provide acceptable image quality for displaying the preview shown on the preview unit 140 but may not necessarily be the image outputted from an imaging operation.

In some example embodiments, the preview shown on the display may be modified or changed without recapturing the document on the imaging surface 110 if a different menu option or feature is selected by the user. For example, if the imaging operation selected is changed from faxing to copying, the fax preview shown on the display may be automatically changed to show a preview using copying settings. In an alternate embodiment, the document may be recaptured between imaging operation selections in order to display a preview using the settings corresponding to the imaging operation selected.

Figure 2:
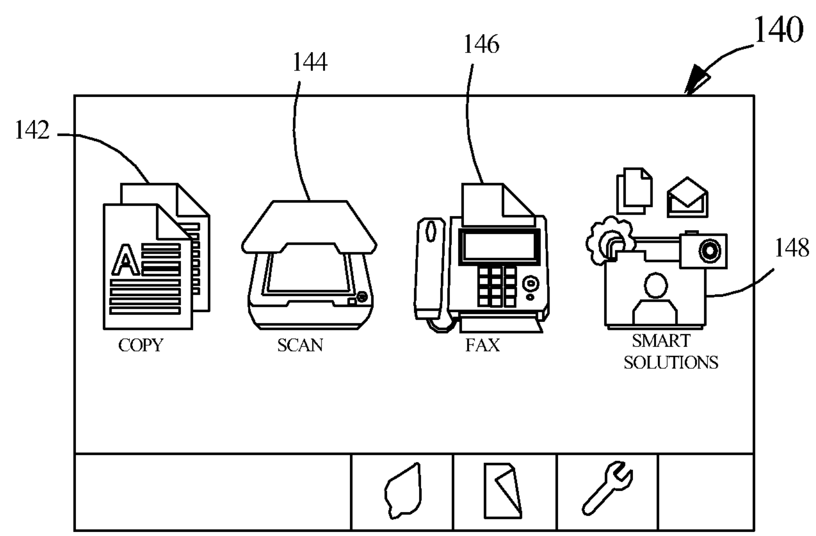
FIG. 2 depicts a layout of a preview unit of the previewing and imaging system of FIG. 1 prior to positioning a document on an imaging surface of the previewing and imaging system.
Figure 4:
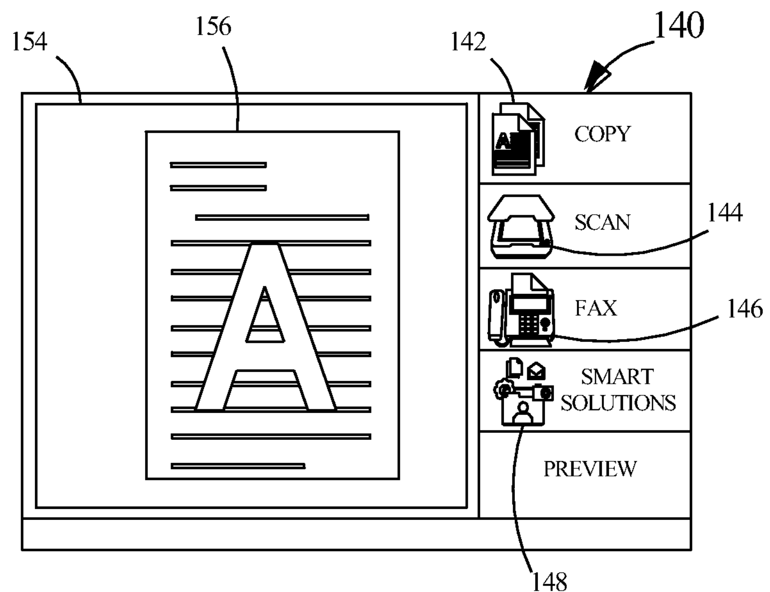
FIG. 4 depicts a layout of the preview unit of the previewing and imaging system of FIG. 1, when the document is positioned on the imaging surface and the covering member is facilitated to assume a close configuration.

In one example embodiment, system 100 may operate as follows. The preview unit 140 may initially represent the home screen, as depicted in FIG. 2, when a user is approaching the system 100. The user may then open the covering member 120 of the system 100. At such an instance, the preview unit 140 may be represented in a manner as depicted in FIG. 3. Thereafter, the user may place a document, such as the document 200, on the imaging surface 110 of the system 100. Subsequently, the covering member 120 may be closed (i.e., the covering member 120 is in the closed configuration). Thereafter, the sensing unit 130 may be triggered and the image 154 of the imaging surface 110 (including the image 156 of the document 200) may be immediately captured and displayed on the preview unit 140 (as depicted in FIG. 4).

In some example embodiments, a shutter sound may be played with the capture and/or display of the image on the preview unit 140. The user may then readjust the position of the document 200 if the user is not satisfied with the image preview in order to appropriately align the document 200 on the imaging surface 110 so that the desired image of the document 200 may be obtained during the imaging operation. The user may then activate an imaging mode (such as scan, copy, and fax) for the imaging operation intended to be performed. In another aspect of some example embodiments, the imaging operation may be preset or selected or activated prior to the preview on the preview unit.

The optimal final image of the document 200 may also be displayed on the preview unit 140. After the completion of the imaging operation, the covering member 120 may be opened, and the document 200 may be removed from the imaging surface 110. The covering member 120 may then be closed. At such an instance, the preview unit 140 may again represent the home screen (as depicted in FIG. 2). Further, the preview and the shutter sound may be suppressed in order to prevent a blank display.

The foregoing description of several example embodiments of the present disclosure has been presented for purposes of illustration. It is not intended to be exhaustive or to limit the disclosure to the precise forms disclosed, and obviously many modifications and variations are possible in light of the above teaching. It is intended that the scope of the disclosure be defined by the claims appended hereto.

What is claimed is:

1. A previewing device, comprising:

a covering member coupled to an imaging surface;

a sensing unit operatively coupled to the covering member, the sensing unit for automatically continuously capturing an image corresponding to the imaging surface at predetermined intervals during a time when the covering member is in an open configuration;

a preview unit operatively coupled with the sensing unit and configured such that at each of the predetermined intervals during the time the covering member is in the open configuration, the preview unit displays image data to of a corresponding captured image, for providing a continuous update of the image displayed;

a processing unit operatively coupled to the sensing unit and configured to determine whether a document is present on the imaging surface based on the captured image; and a housing in which the sensing unit and the processing unit are disposed and to which the covering member and the preview unit are connected such that the image data is displayed by the preview unit from the housing, wherein the processing unit is further operatively coupled to the preview unit and when it has been determined that the document is present on the imaging surface based on the captured image, the processing unit is further configured to format the captured image according to a plurality of settings associated with an imaging operation to be performed, each formatted captured image being displayed as the image data on the preview unit during the time the covering member is in the open configuration and wherein at least one formatted captured image is used in performing the imaging operation.

2. The previewing device of claim 1, further comprising an audio unit operatively coupled to the preview unit, the audio unit adapted to generate an audio signal when the image data is displayed on the preview unit.

3. The previewing device of claim 1, wherein the imaging surface is oriented vertically.

4. The previewing device of claim 1, wherein the preview unit is configured to display image data of the formatted captured image only upon determining that the document is present on the imaging surface based on the captured image.

5. The previewing device of claim 1, wherein the processing unit is further configured to receive one or more setting modifications from a user for the plurality of settings associated with the imaging operation and display a modified image data on the preview unit based on the received modifications.

6. A method of previewing an image on a device having a housing, comprising:

detecting, within the housing, whether a covering member of the device is in an open configuration;

upon a positive detection, and at each of a plurality of time intervals during a period of time when the covering member remains in the open configuration, continuously automatically capturing an image corresponding to an imaging surface of the device;

determining, within the housing, whether a document is present on the imaging surface based on the captured image; and upon a positive determination, formatting, within the housing, each captured image to match a plurality of settings associated with an imaging operation to be performed and during the period of time displaying, at each of the plurality of time intervals, image data corresponding to a corresponding formatted captured image on a preview unit disposed on the housing of the device such that a continuous update of the image data is displayed by the preview unit from the housing, and wherein at least one formatted captured image is used in performing the imaging operation.

7. The method of claim 6, wherein the automatically capturing the image comprises taking a photograph of the imaging surface and checking whether the photograph has content.

8. The method of claim 6, wherein the automatically capturing the image comprises brightening an illuminator to an intensity higher than is used for a scan operation where a performance of an image quality operation is not suppressed.

9. The method of claim 6, wherein the imaging surface is oriented vertically.

10. The method of claim 6, wherein the imaging operation is scanning.

11. The method of claim 6, wherein the imaging operation is copying.

12. The method of claim 6, wherein the imaging operation is faxing.

13. The method of claim 6, further comprising:

receiving a second imaging operation selection from a user;

reformatting each captured image according to a plurality of settings associated with the second imaging operation; and displaying image data corresponding to each reformatted captured image.

14. The method of claim 6, wherein the automatically capturing comprises suppressing performance of an image quality operation.

15. The method of claim 14, wherein the image quality operation is at least one of a gamma correction, a shading correction and a color table lookup.

16. The method of claim 6, further comprising receiving, from the user, one or more adjustments for the plurality of settings associated with the operation and modifying the displayed image data on the preview unit according to the received adjustments.

17. A method of previewing an image on a device having a housing, comprising:

detecting, within the housing, whether a covering member coupled to the housing of the device is open; and upon such detection, performing, within the housing and at each of a plurality of predetermined intervals during a period of time the covering member remains open, the acts of:

continuously capturing an image on an imaging surface of the device;

determining whether the captured image has content;

upon a positive determination that the captured image has content, formatting, within the housing, the captured image to match a plurality of settings associated with an imaging operation to be performed; and displaying image data corresponding to each formatted, captured image from the housing for providing a continuously updated preview of the images captured; and receiving from a user one or more adjustments for the plurality of settings and modifying at least one formatted captured image according to the received adjustments for display as the image data on the preview unit prior to performing the imaging operation.

18. The method of claim 17, further comprising detecting whether the covering member of the device is in a closed configuration.

19. The method of claim 18, further comprising continuing to display the image data upon detecting the covering member is in the closed configuration.

20. The method of claim 17, wherein the capturing at each of the plurality of predetermined intervals results in a plurality of captured images, and the displaying comprises displaying image data corresponding to a most recently captured image of the plurality of captured images.

21. The method of claim 17, wherein each of the continuous capturing captures an image corresponding to the imaging surface and the image data displayed at each of the plurality of predetermined intervals comprises a preview of a sheet of media positioned along the imaging surface of the device.

22. A previewing device, comprising:

a covering member coupled to an imaging surface;

a sensing unit operatively coupled to the covering member, the sensing unit for automatically capturing an image corresponding to the imaging surface upon detecting the covering member is in an open configuration;

a preview unit operatively coupled with the sensing unit and configured to display image data corresponding to the captured image;

a processing unit operatively coupled to the sensing unit and configured to determine whether the captured image has content; and a housing in which the sensing unit and the processing unit are disposed and to which the covering member and the preview unit are attached such that image data displayed by the preview unit is displayed from the housing, wherein at a plurality of predetermined intervals when the covering member is in the open configuration, the sensing unit continuously captures an image corresponding to the imaging surface and the preview unit continuously updates the image data displayed based upon the continuously captured images, wherein the processing unit is further operatively coupled to the preview unit and when it has been determined that the captured image has content, the processing unit is further configured to format the captured image according to a plurality of settings associated with an imaging operation, receive from a user one or more adjustments for the plurality of settings and modify at least one of the captured images according to the received adjustments for display as the image data on the preview unit prior to performing the imaging operation.

23. The previewing device of claim 22, wherein the preview unit is configured to display the image data of the captured image only upon the processing unit determining that the captured image has content.

24. The previewing device of claim 22, wherein the processing unit is further configured to receive a second imaging operation selection from the user and format the continuously captured images according to a plurality of settings associated with the second imaging operation selection, at least one of the formatted captured images for display as the image data on the preview unit prior to performing the second imaging operation selection.

* * * * *